(12) United States Patent
Ozeki et al.

(10) Patent No.: US 10,725,713 B2
(45) Date of Patent: Jul. 28, 2020

(54) IMAGE FORMING APPARATUS, IMAGE FORMING SYSTEM, CONTROL METHOD, AND RECORDING MEDIUM

(71) Applicants: Kaori Ozeki, Shizuoka (JP); Taijirou Sueishi, Kanagawa (JP); Akiko Bamba, Tokyo (JP); Kohei Chubachi, Tokyo (JP); Hiroshi Morikawa, Kanagawa (JP)

(72) Inventors: Kaori Ozeki, Shizuoka (JP); Taijirou Sueishi, Kanagawa (JP); Akiko Bamba, Tokyo (JP); Kohei Chubachi, Tokyo (JP); Hiroshi Morikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/269,733

(22) Filed: Feb. 7, 2019

(65) Prior Publication Data

US 2019/0303060 A1 Oct. 3, 2019

(30) Foreign Application Priority Data

Mar. 29, 2018 (JP) ................................ 2018-066209

(51) Int. Cl.
*G06F 3/12* (2006.01)
*G06K 15/00* (2006.01)
*G03G 15/00* (2006.01)

(52) U.S. Cl.
CPC ....... *G06F 3/1217* (2013.01); *G03G 15/5012* (2013.01); *G06F 3/1258* (2013.01);

(Continued)

(58) Field of Classification Search
None
See application file for complete search history.

(56) References Cited

U.S. PATENT DOCUMENTS 6,633,398 B1 10/2003 Morikawa
2008/0260413 A1* 10/2008 Kimura .............. G03G 15/5062
399/82

(Continued)

FOREIGN PATENT DOCUMENTS

| EP | 1983380 A1 | 10/2008 |
| JP | 2010-064388 | 3/2010 |
| JP | 2010064388 A * | 3/2010 |

OTHER PUBLICATIONS

European Search Report dated Sep. 3, 2019 in European Application No. 19156920.1.

*Primary Examiner* — Henok Shiferaw
(74) *Attorney, Agent, or Firm* — Harness, Dickey & Pierce, P.L.C.

(57) ABSTRACT

An image forming apparatus includes a printing device to perform normal printing of a job according to a setting, and processing circuitry to: accept a request for executing printing of another job while the printing device is performing the normal printing of the job according to the setting; when the request for executing printing of another job is a request for executing trial printing, control the printing device to interrupt the normal printing of the job to perform the trial printing of the another job; and control an ejection device to discharge a recording medium printed in the normal printing of the job and a recording medium printed in the trial printing of the another job on different sheet discharge trays.

13 Claims, 10 Drawing Sheets

(52) U.S. Cl.
CPC .......... *G06F 3/1263* (2013.01); *G06F 3/1285* (2013.01); *G06K 15/403* (2013.01); *G03G 15/5062* (2013.01); *G03G 15/5083* (2013.01); *G03G 2215/00569* (2013.01)

(56) References Cited

U.S. PATENT DOCUMENTS

| | | | |
|---|---|---|---|
| 2011/0199642 A1* | 8/2011 | Utsunomiya | G03G 15/5062 358/1.15 |
| 2014/0333944 A1 | 11/2014 | Ueda | |
| 2017/0060025 A1 | 3/2017 | Fujitani | |

* cited by examiner

IMAGE FORMING APPARATUS, IMAGE FORMING SYSTEM, CONTROL METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2018-066209, filed on Mar. 29, 2018, in the Japan Patent Office, the entire disclosure of which is hereby incorporated by reference herein.

BACKGROUND

Technical Field

The present invention relates to an image forming apparatus, an image forming system, a control method, and a recording medium.

Description of the Background Art

In recent years, image forming apparatuses have become large and high in performance, and become possible to generate a large quantity of printed matter in a short time.

Some conventional image forming apparatuses store printed matter in a large capacity stacker whose opening and closing is locked when a large number of sheets are printed at high speed. Some of such conventional image forming apparatuses have a sample output (trial copying) function capable of confirming the finish of printed matter even while the image forming apparatuses are in operation. As sample output, for example, sheet feeding during printing and printing are performed double almost simultaneously with the operation by operator's operation, one sheet is handled as a sheet of a normal job, and another sheet is ejected to another sheet ejection tray in which an image formation status is easy to be confirmed.

In a case of performing printing of a large number of sheets such as commercial printing, job setting and trial printing are repeated in order to adjust the color before normal printing. However, in a case of performing printing of a plurality of jobs consecutively, trial printing of the succeeding job cannot be performed until the normal printing of the preceding job is completed. As described above, in the conventional image forming apparatus, after completion of the normal printing of the preceding job, the job setting of the succeeding job and the trial printing are repeated to adjust the color, so that there is a drawback that non-printing time (down time) other than printing time at which normal printing is performed (up time) increases.

SUMMARY

Example embodiments of the present invention include an image forming apparatus including a printing device to perform normal printing of a job according to a setting, and processing circuitry to: accept a request for executing printing of another job while the printing device is performing the normal printing of the job according to the setting; when the request for executing printing of another job is a request for executing trial printing, control the printing device to interrupt the normal printing of the job to perform the trial printing of the another job; and control an ejection device to discharge a recording medium printed in the normal printing of the job and a recording medium printed in the trial printing of the another job on different sheet discharge trays.

Example embodiments of the present invention include a printing system including a terminal device and an image forming apparatus communicably connected with the terminal device and to perform printing. The terminal device includes: an input device to accept a request for executing printing of a job according to a setting; and a communication device to transmit the request that has been accepted to the image forming apparatus. The image forming apparatus includes: a printing device to perform normal printing of a job according to a setting; a communication device to receive the request for executing printing of the job from the terminal device, while the printing device is performing the normal printing of the job according to the setting; processing circuitry to: when the request for executing printing of the job received from the terminal device is a request for executing trial printing, control the printing device to interrupt the normal printing of the job to perform the trial printing of the job; and control an ejection device to discharge a recording medium printed in the normal printing of the job and a recording medium printed in the trial printing of the job on different sheet discharge trays.

Example embodiments of the present invention include a control method for controlling printing, performed by an image forming apparatus, the method including: using a printing device, performing normal printing of a job according to a setting; accepting a request for executing printing of another job while the printing device is performing the normal printing of the job according to the setting; determining whether the request for executing printing of another job is a request for executing trial printing; interrupting the normal printing of the job being performed by the printing device, when the determining determines that the request for executing printing of another job is a request for executing trial printing; using the printing device, performing the trial printing of the another job; and controlling an ejection device to discharge a recording medium printed in the normal printing of the job and a recording medium printed in the trial printing of the another job on different sheet discharge trays.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Next, a mode for performing the present invention will be described with reference to the drawings on the basis of the following embodiments.

First Embodiment

Hardware Configuration

Figure 1:
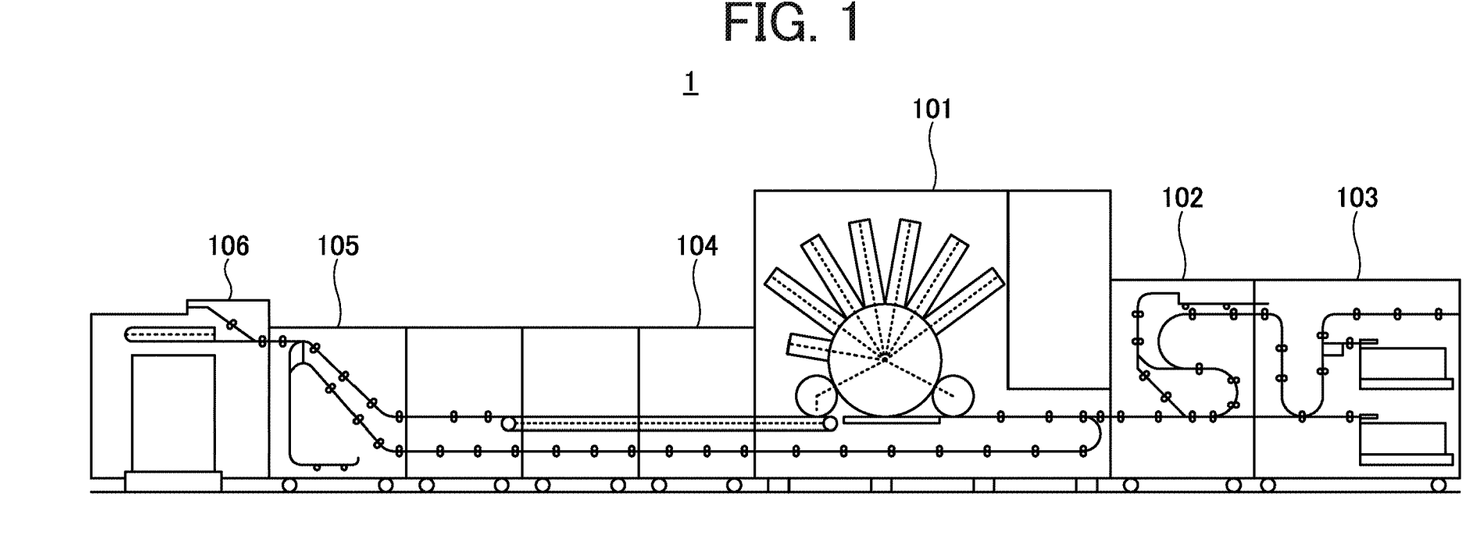
FIG. 1 is a configuration diagram of an example of an image forming apparatus according to an embodiment.

FIG. 1 is a configuration diagram of an example of an image forming apparatus according to the present embodiment. The image forming apparatus 1 in FIG. 1 includes an image formation unit 101, a pre-coating unit 102, a sheet feeding unit 103, a drying and cooling unit 104, a reversing unit 105, and a sheet ejection unit 106. The sheet feeding unit 103 conveys a sheet, which is an example of a recording medium, to the image formation unit 101 or the like. Since it is sometimes difficult for the pre-coating unit 102 to fix the ink depending on the type of sheet, pre-coating liquid for easily fixing the ink is applied to the sheet. The image formation unit 101 winds a sheet around a drum and forms an image on a sheet wound around the drum by a line head.

The drying and cooling unit 104 dries the image formed on the sheet by the image formation unit 101, and fixes the image on the sheet. In a case of forming an image also on the reverse side of the sheet conveyed from the drying and cooling unit 104, the reversing unit 105 conveys again a sheet that is switched back to the image formation unit 101. The sheet ejection unit 106 stacks the sheet on which the image has been fixed by the drying and cooling unit. As will be described later, the sheet ejection unit 106 has a plurality of sheet discharge trays, such as a normal printing tray on which printed matter of normal printing is ejected and a proof tray on which printed matter of trial printing is ejected.

In this disclosure, normal printing refers to printing one or more images onto one or more recording sheets (or any type of recording mediums) according to a setting to complete a job, in response to a request for executing a job of printing specified with the setting. Further, trial printing is printing one or more images onto one or more recording sheets to check the quality of print outputs, in response to a request for executing trial printing. For example, the image forming apparatus 1 performs printing of the first page, when the request for executing trial printing is received.

In FIG. 1, an inkjet type image forming apparatus 1 is illustrated as an example. The inkjet type image forming apparatus 1 is an example of a device or apparatus for ejecting droplets (ink or the like) from an ejector (ejection head, ink head, recording head, ink jet, or the like) to form an image on a surface of a recording medium. The image forming apparatus 1 may be of an electrophotographic type in FIG. 2.

Figure 2:
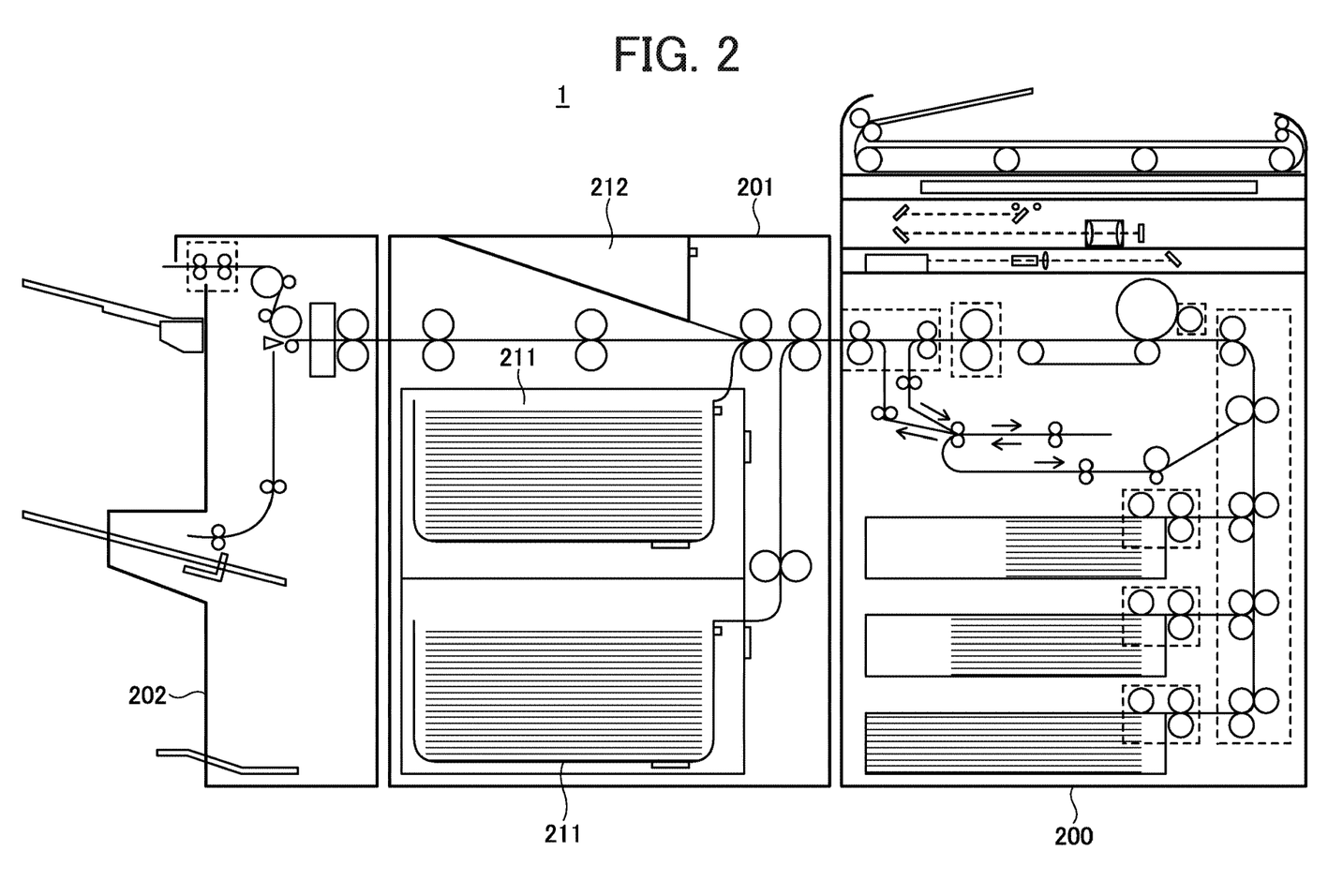
FIG. 2 is a configuration diagram of another example of the image forming apparatus according to the present embodiment.

FIG. 2 is a configuration diagram of another example of the image forming apparatus according to the present embodiment. The image forming apparatus 1 in FIG. 2 has a main body 200, a large capacity stacker 201, and a post processing device 202. The main body 200 has a scanner, a printer engine, a sheet feeder, and a sheet ejector. The printer engine includes an optical writing device, an image forming device, and a fixing device. In the image forming device, a laser beam modulated by the optical writing device according to image information read by the scanner reaches a photosensitive drum, thereby writing a latent image on the photosensitive drum.

The latent image written on the photosensitive drum is developed into a toner image by a developing unit of the image forming device. The toner image is transferred onto a sheet conveyed by a conveying belt that rotates at the same speed as the photosensitive drum. This sheet is conveyed to the fixing device. The fixing device includes a heating roller and a pressure roller, and fixes the transferred image. The sheet stored in the sheet feeder is conveyed to a position where the sheet contacts the photosensitive drum by a vertical conveying unit. The sheet ejector has an ejection unit that ejects the sheet on which an image is formed to the large capacity stacker 201, and a switch back unit that reverses the sheet on which an image is formed on one side and feeds the sheet again to form an image on both sides.

The large capacity stacker 201 has a plurality of stacker trays 211. The large capacity stacker 201 further includes a sample tray 212 at the top. Any one of the stacker trays 211 and the sample tray 212 of the large capacity stacker 201 can be selectively used. The large capacity stacker 201 can also eject sheets to the post processing device 202 at the subsequent stage via a through path without using the stacker trays 211 and the sample tray 212. The post processing device 202 performs post processing such as punching and stapling on the sheet ejected from the large capacity stacker 201, and then ejects the sheet to the sheet ejection tray.

Figure 3:
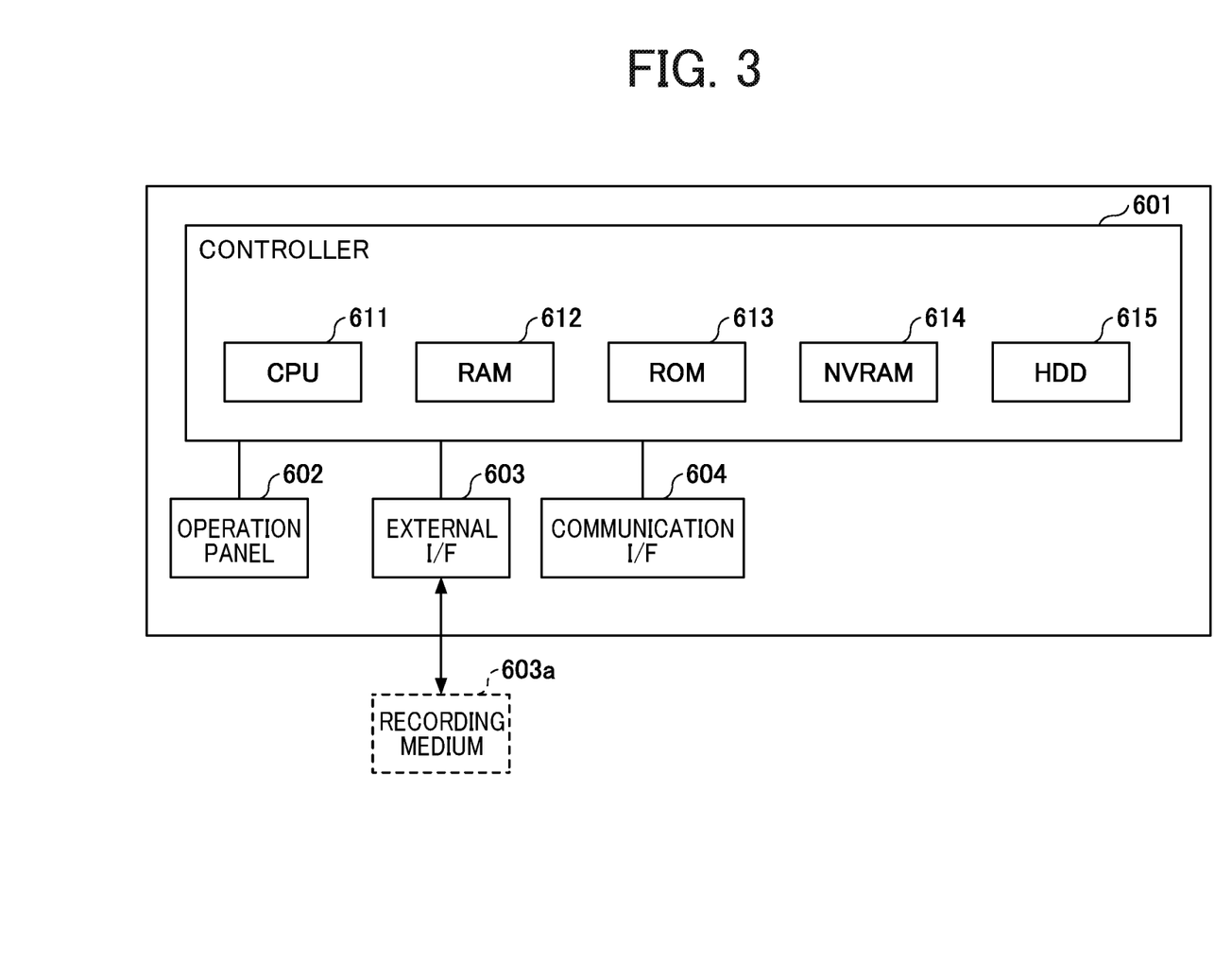
FIG. 3 is a hardware configuration diagram of a computer in the image forming apparatus according to the present embodiment.

The image forming apparatus 1 in FIGS. 1 and 2 further includes, for example, a computer illustrated in FIG. 3 for controlling processing relating to image formation using software. FIG. 3 is a hardware configuration diagram of an example of a computer.

The computer in FIG. 3 includes a controller 601, an operation panel (control panel) 602, an external device interface (I/F) 603, a communication I/F 604, and the like. Further, the controller 601 includes a central processing unit (CPU) 611, a random access memory (RAM) 612, a read only memory (ROM) 613, a nonvolatile random access memory (NVRAM) 614, a hard disc drive (HDD) 615, and the like. The ROM 613 stores various programs and data. The RAM 612 temporarily stores programs and data. The NVRAM 614 stores setting information such as a job setting and the like. The HDD 615 stores various programs and data such as job data.

The CPU 611 reads programs, data, setting information, and the like from the ROM 613, the NVRAM 614, the HDD 615 and the like onto the RAM 612 and performs processing, to implement the control and functions of the entire image forming apparatus 1.

The operation panel 602 includes an input unit that accepts an input from an operator and a display for displaying. In this disclosure, the operator corresponds to a user who is using the image forming apparatus. The external device I/F 603 is an interface with external devices. The external devices include a recording medium 603*a* and the like. As a result, the image forming apparatus 1 can perform at least one of reading and writing of the recording medium 603*a* via the external device I/F 603. The recording medium 603*a* is, for example, an integrated circuit (IC) card, a flexible disk, a compact disc (CD), a digital video disk (DVD), a secure digital (SD) memory card, a universal serial bus (USB) memory, a subscriber identity module (SIM) card, or the like. The communication I/F 604 is an interface for connecting the image forming apparatus 1 to the network.

In the present embodiment, the software executed by the computer of FIG. 3 and the hardware resources illustrated in FIGS. 1 to 3 cooperate with each other, so that information processing by the functional block of FIG. 4 to be described later is implemented.

Software Configuration

Figure 4:
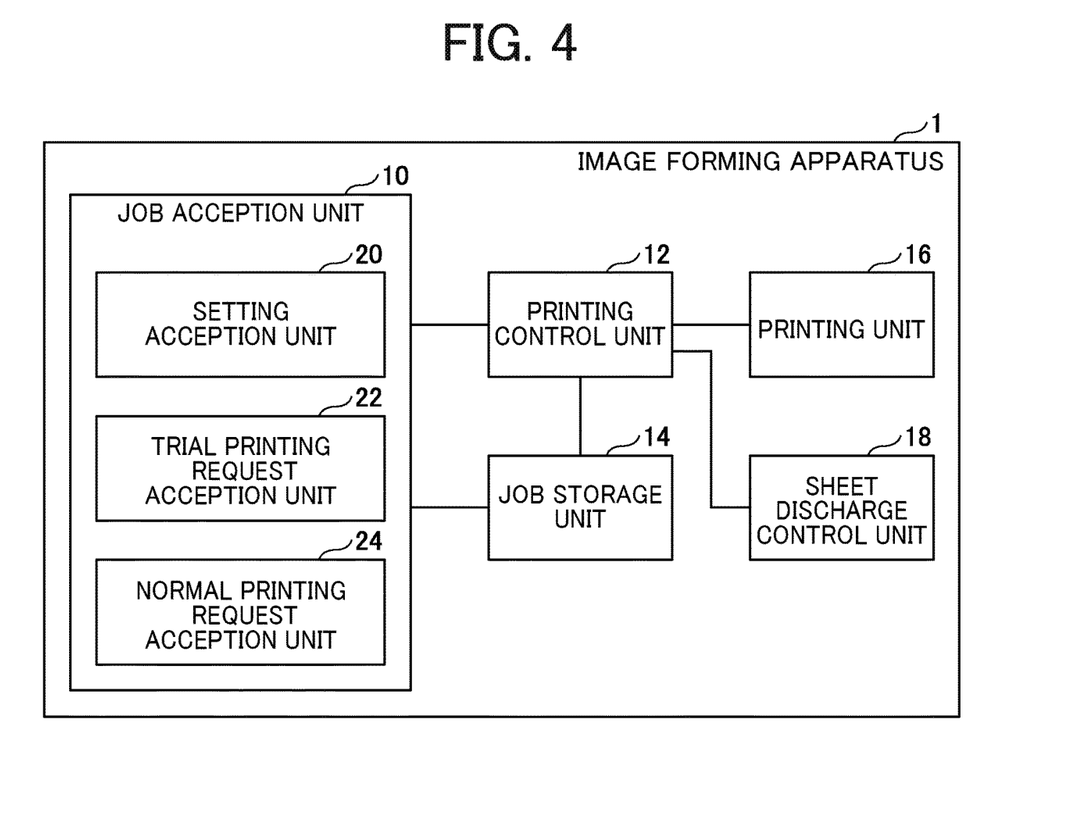
FIG. 4 is a functional block diagram of an example of the image forming apparatus according to the present embodiment.

The image forming apparatus 1 according to the present embodiment implements, for example, a functional block illustrated in FIG. 4. FIG. 4 is a functional block diagram of an example of the image forming apparatus according to the present embodiment. The image forming apparatus 1 in FIG. 4 includes a job acceptance unit 10, a printing control unit 12, a job storage unit 14, a printing unit 16, and a sheet ejection control unit 18. The job acceptance unit 10 includes a setting acceptance unit 20, a trial printing request acceptance unit 22, and a normal printing request acceptance unit 24.

The job acceptance unit 10 accepts a job setting, a request for executing trial printing, a request for executing normal printing, and the like from the operator. The setting acceptance unit 20 of the job acceptance unit 10 accepts a job setting for performing, for example, color adjustment from the operator. The job acceptance unit 10 is implemented by, for example, instructions of the CPU 611, and the operation panel 602, specifically, a job setting column 1004 referring to FIG. 8.

The trial printing request acceptance unit 22 accepts a request for executing trial printing from the operator and sends the accepted request for executing trial printing to the printing control unit 12. The normal printing request acceptance unit 24 accepts a request for executing normal printing from the operator and sends the accepted request for executing normal printing to the printing control unit 12. The trial printing request acceptance unit 22 is implemented by instructions of the CPU 611 and the operation panel 602, specifically, a "Print" "Sample Print(interrupt)" button in FIG. 8. The normal printing request acceptance unit 24 is implemented by instructions of the CPU 611 and the operation panel 602, specifically, a "Print" button in FIG. 8.

The printing control unit 12 accepts from the job acceptance unit 10 a request for executing trial printing or a request for executing normal printing for which the job setting is specified, and controls the trial printing or normal printing to be executed by the printing unit 16 as described later. The printing control unit 12 also requests the sheet ejection control unit 18 to eject the printed matter printed in the trial printing by the printing unit 16 and the printed matter printed in the normal printing by the printing unit 16 from different discharge trays. The printing control unit 12 is implemented by the instructions of the CPU 611. The printing unit 16 is any printing device capable of printing, such as the image formation unit 101 illustrated in FIG. 1 or the printer engine illustrated in FIG. 2.

The job storage unit 14 stores job settings and job data. The job storage unit 14 is implemented by the instructions of the CPU 611 and any desired memory. The printing unit 16 performs trial printing or normal printing of the job for which the execution request has been accepted, according to the specified job setting. The printing unit 16 is implemented by the instructions of the CPU 611 and the image formation unit 101 (FIG. 1) or the printer engine (FIG. 2). According to the request from the printing control unit 12, the sheet ejection control unit 18 performs control such that the printed matter printed in the trial printing by the printing unit 16 and the printed matter printed in the normal printing by the printing unit 16 are ejected from different discharge trays. The sheet ejection control unit 18 is implemented by the instructions of the CPU 611, which operates in cooperation with the sheet ejection unit 106 (FIG. 1) or the sheet ejector (FIG. 2). The sheet ejection unit 106 and the sheet ejector are each an example of a sheet ejection device.

Processing

Overview

Hereinafter, a job normal printing of which is performed in advance is referred to as a preceding job, and one or more jobs normal printing of which is performed later than a preceding job is referred to as a succeeding job. It is assumed that, in a job, at least one trial printing is performed before performing of normal printing.

Figure 5:
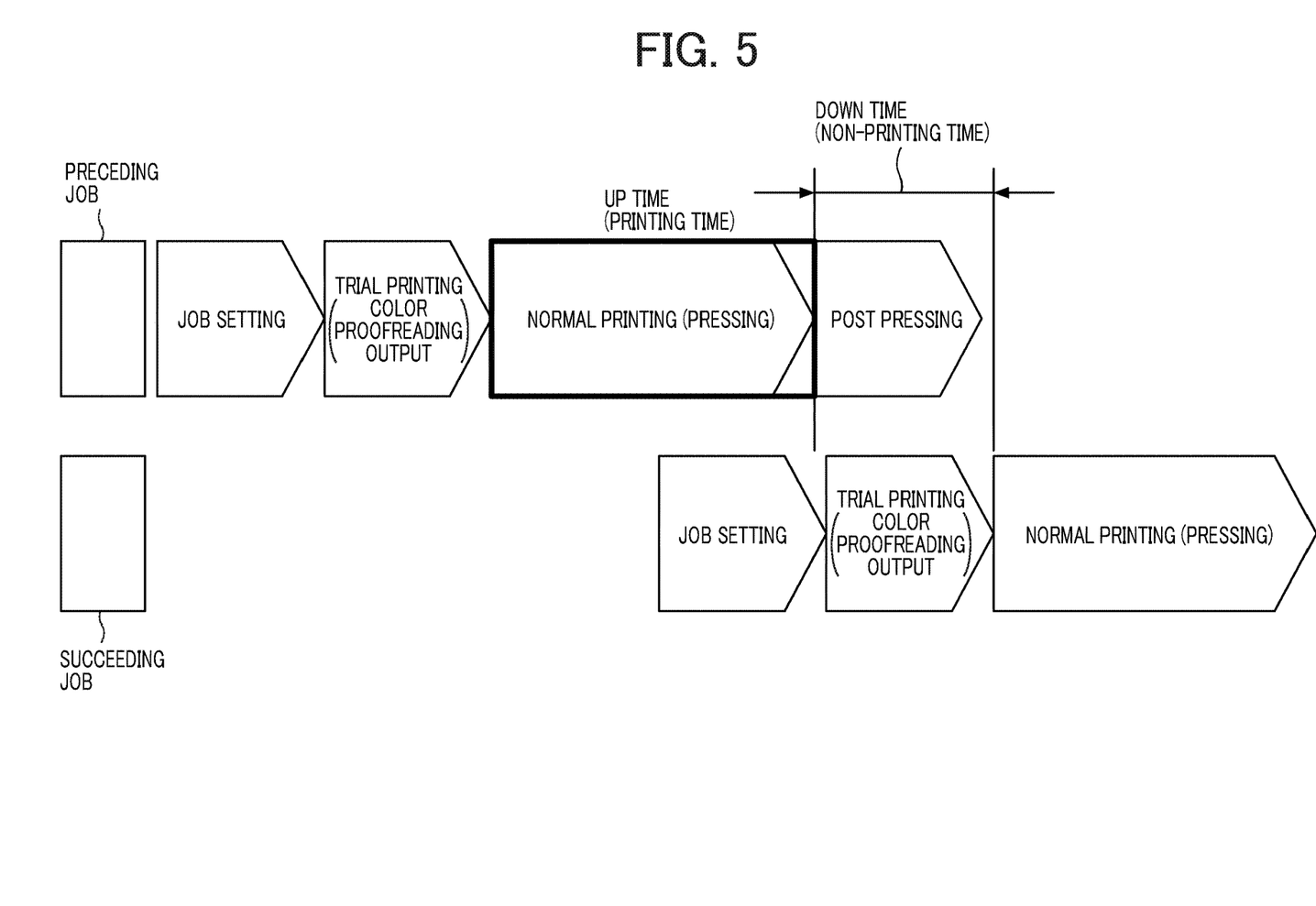
FIG. 5 is a schematic diagram for describing down time occurring between pieces of normal printing of a job performed consecutively.

In a case where trial printing of a succeeding job is performed after completion of normal printing of a preceding job, as illustrated in FIG. 5, for example, non-printing time (down time) other than printing time (up time) in which the normal printing is performed increases.

FIG. 5 is a schematic diagram for describing down time occurring between pieces of normal printing of a job performed consecutively. The upper part of FIG. 5 illustrates the timing at which job setting, trial printing, normal printing, and post pressing (post processing) of a preceding job are performed. The lower part of FIG. 5 illustrates the timing at which job setting, trial printing, normal printing, and post pressing of a succeeding job are performed.

As illustrated in FIG. 5, in the image forming apparatus 1 that performs trial printing of a succeeding job after completion of the normal printing of the preceding job, down time occurs, which is time from the completion of the normal printing of the preceding job until the normal printing of the succeeding job is started. The down time increases as the number of times of repeating the job setting and the trial printing of the succeeding job increases.

Figure 6:
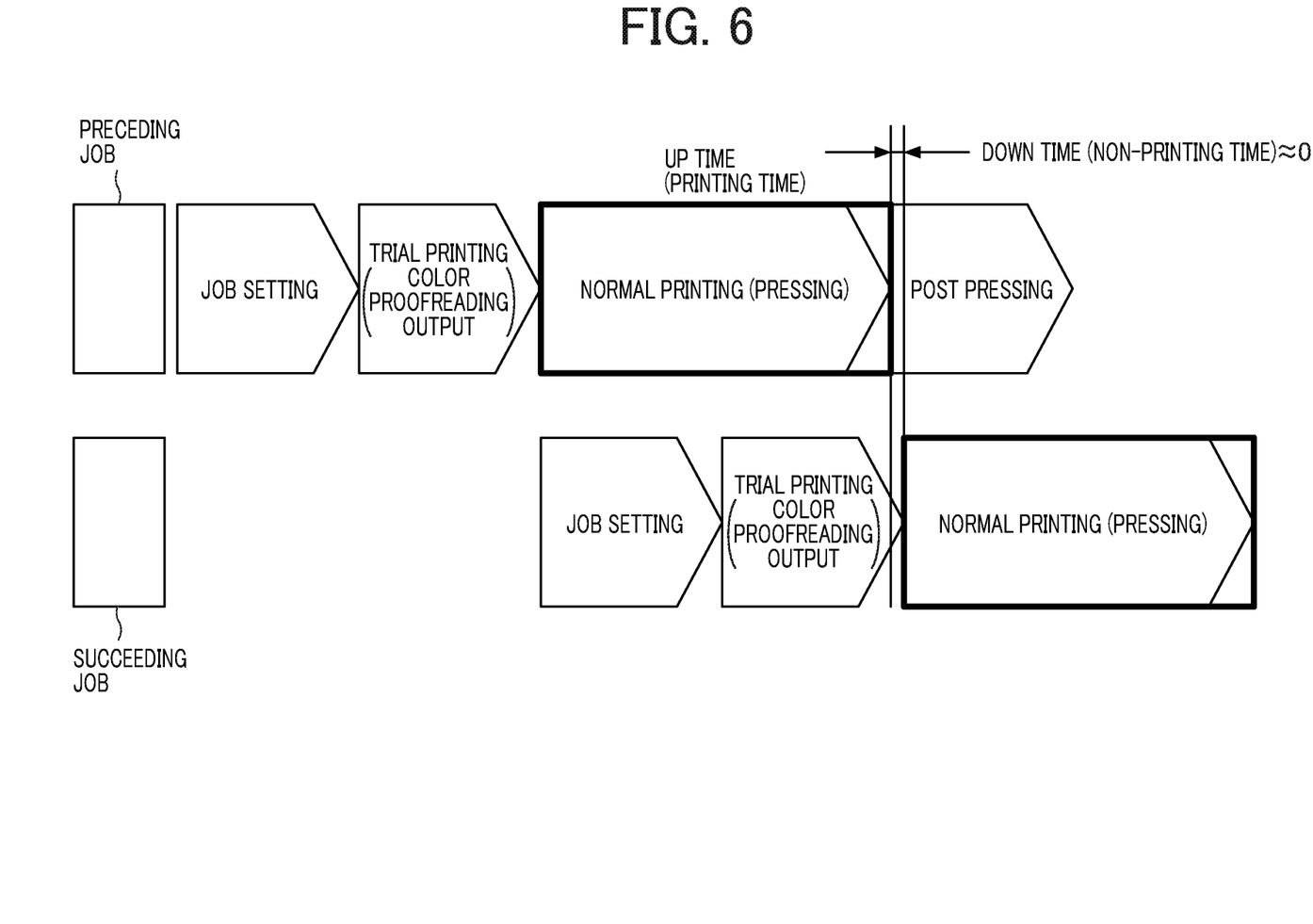
FIG. 6 is a schematic diagram for describing down time occurring between pieces of normal printing of a job performed consecutively in the image forming apparatus according to the present embodiment.

In the present embodiment, trial printing of the succeeding job is performed interrupting in the normal printing of the preceding job, so that the down time is reduced to almost "0", for example, as illustrated in FIG. 6.

FIG. 6 is a schematic diagram for describing down time occurring between pieces of normal printing of a job performed consecutively in the image forming apparatus according to the present embodiment. FIG. 6 is different from FIG. 5 in the timing in the lower part at which the succeeding job is performed. As illustrated in the lower part of FIG. 6, the image forming apparatus 1 according to the present embodiment performs the trial printing of the succeeding job interrupting in the normal printing of the preceding job, so that the job setting and trial printing of the succeeding job can be completed before the normal printing of the preceding job is completed.

Therefore, in the image forming apparatus 1 according to the present embodiment that performs the trial printing of the succeeding job interrupting in the normal printing of the preceding job, even if the number of times of repeating the job setting and the trial printing of the succeeding job increases, the downtime can be reduced to almost "0".

Figure 7:
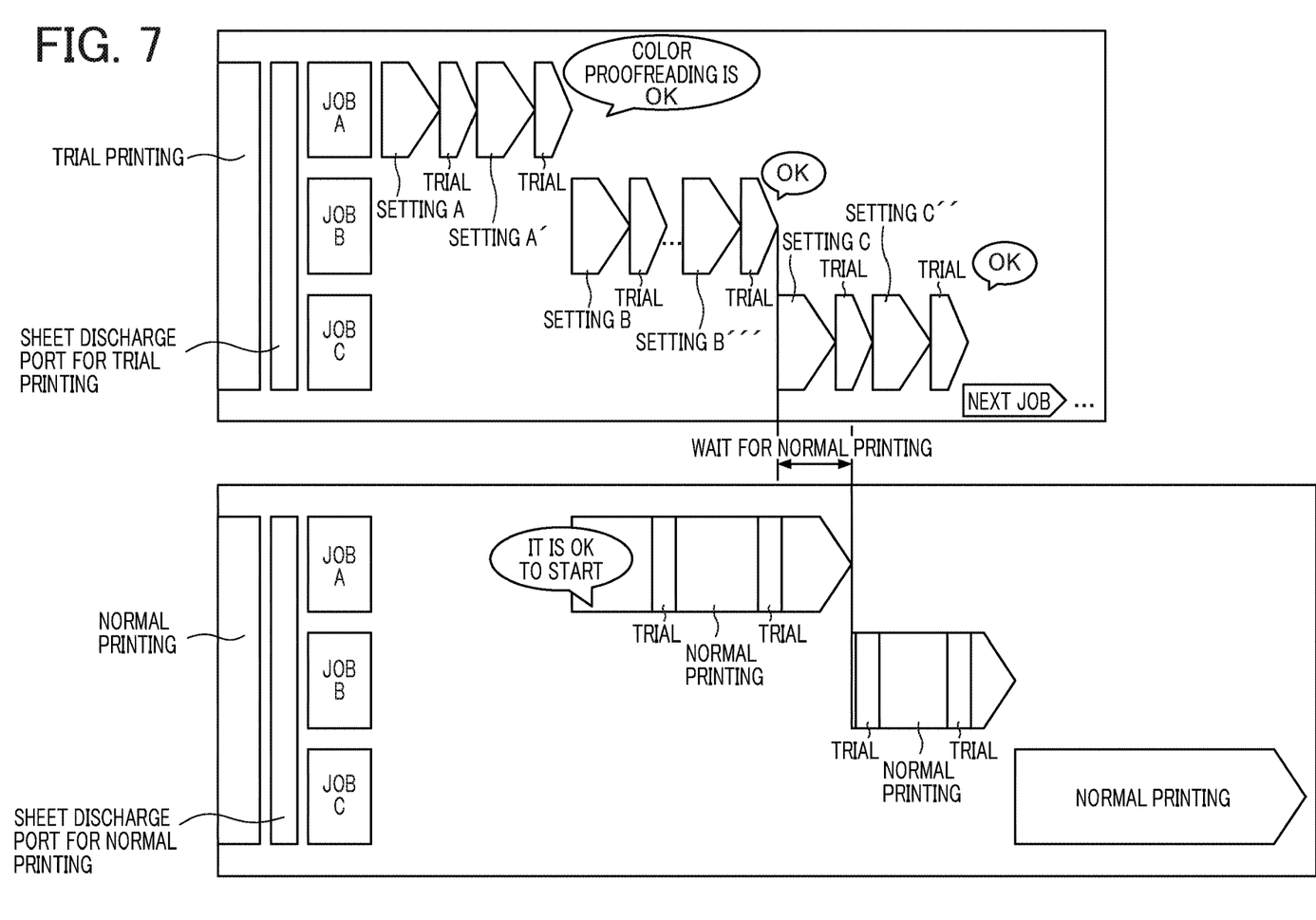
FIG. 7 is a time table of an example of trial printing and normal printing of a job performed consecutively in the image forming apparatus according to the present embodiment.

FIG. 7 is a time table of an example of trial printing and normal printing of a job performed consecutively in the image forming apparatus according to the present embodiment. The trial printing illustrated in FIG. 7 is an operation by the operator. The normal printing is performed by the image forming apparatus 1 in accordance with the order of accepting requests for executing normal printing.

In the example of FIG. 7, the operator performs job setting and trial printing in the order of "Job A", "Job B", and "Job C". When the color proofreading is completed by trial printing of "Job A", the operator makes a request for executing normal printing from the operation screen to be described later. Since the normal printing is not performed, the image forming apparatus 1 starts the normal printing of "Job A" for which the execution request has been accepted.

Job setting and trial printing of "Job B" are performed while normal printing of "Job A" is being performed. For example, although the job setting and trial printing of "Job B" illustrated in FIG. 7 are performed twice, the trial printing is performed interrupting in the normal printing of "Job A". The trial printing is performed interrupting in, for example, between copies of normal printing of "Job A", and printed matter is ejected to a sheet discharge tray for trial printing different from a sheet discharge tray for normal printing. As illustrated in FIG. 7, the time for trial printing performed interrupting in the normal printing is short, and has little influence on the operation efficiency of the normal printing. When the color proofreading is completed by trial printing of "Job B", the operator makes a request for executing normal printing from the operation screen to be described later. Since the normal printing of "Job A" is being performed, the image forming apparatus 1 causes the normal printing of "Job B" for which the execution request has been accepted to wait until the normal printing of "Job A" is completed.

Job setting and trial printing of "Job C" are performed while normal printing of "Job A" and "Job B" is being performed. For example, although the job setting and trial printing of "Job C" illustrated in FIG. 7 are performed twice, the trial printing is performed interrupting in the normal printing of "Job B". The trial printing is performed interrupting in, for example, between copies of normal printing of "Job B", and printed matter is ejected to a sheet discharge tray for trial printing different from a sheet discharge tray for normal printing.

When the color proofreading is completed by trial printing of "Job C", the operator issues a request for executing normal printing from the operation screen to be described later. Since the normal printing of "Job B" is being performed, the image forming apparatus 1 causes the normal printing of "Job C" for which the execution request has been accepted to wait until the normal printing of "Job B" is completed.

As illustrated in the time table of FIG. 7, the image forming apparatus 1 according to the present embodiment can make the work of the operator independent from the normal printing. The operator can efficiently perform the work up to the color proofreading of the job to be performed consecutively. The image forming apparatus 1 accepts the request for executing the normal printing of the job whose work up to color proofreading has been completed, without waiting for the completion of the normal printing of the preceding job, and can start the normal printing at the timing when the normal printing becomes possible, so that the downtime can be reduced.

Figure 8:
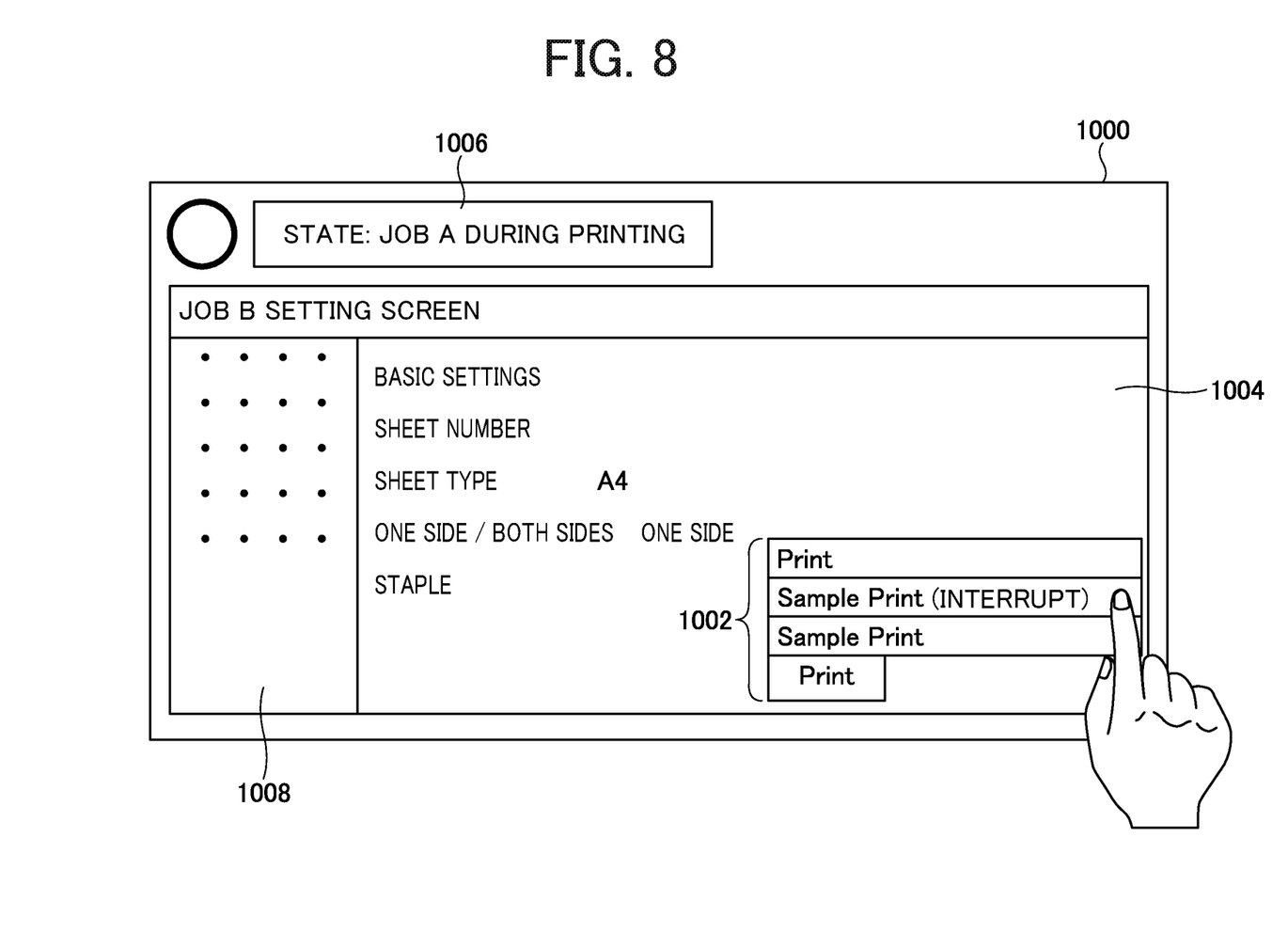
FIG. 8 is an image diagram of an example of an operation screen according to the present embodiment.

FIG. 8 is an image diagram of an example of an operation screen according to the present embodiment. An operation screen 1000 in FIG. 8 includes a request acceptance button 1002, a job setting column 1004, an operation status display column 1006, and a job list screen 1008.

The request acceptance buttons 1002 illustrated in FIG. 8 include the "Print" button for accepting a request for executing normal printing from the operator, the "Sample Print (interrupt)" button for accepting a request for executing trial printing interrupting in the normal printing of the preceding job that is being performed, and the like.

The job setting column 1004 is a column for accepting a job setting of "Job B" from the operator. The operation status display column 1006 is a column for displaying the operation status of the image forming apparatus 1, and indicates that the image forming apparatus 1 is in the normal printing of "Job A". The job list screen 1008 is a column for selecting jobs for issuing the execution request for the job setting and the trial printing, and the request for executing the normal printing.

Figure 9:
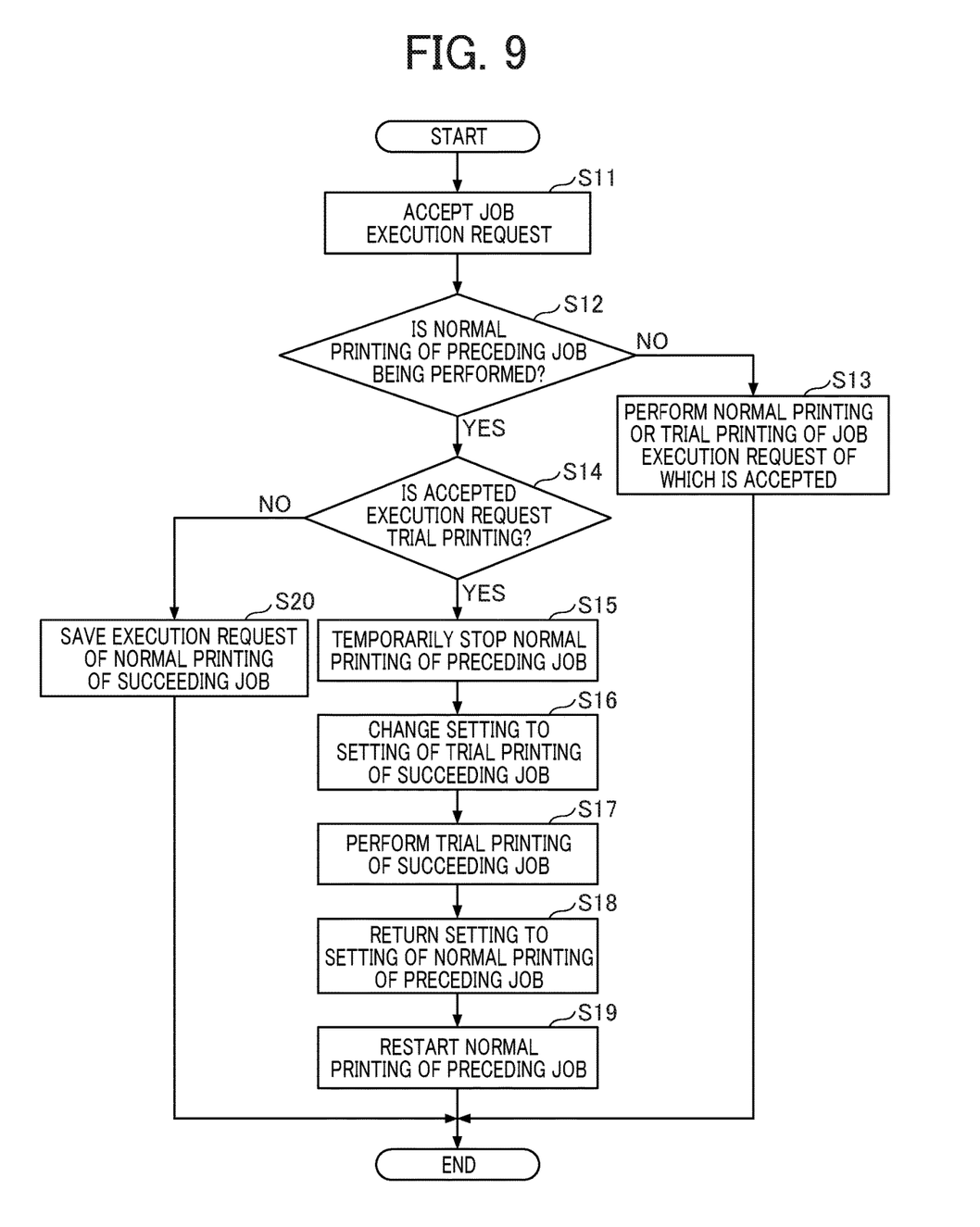
FIG. 9 is a flowchart of an example of processing of controlling trial printing or normal printing performed by the image forming apparatus.

FIG. 9 is a flowchart of an example of processing of controlling trial printing or normal printing performed by a printing unit under control of a printing control unit. The process proceeds to step S11, and the printing control unit 12 accepts a request for executing trial printing, or a request for executing normal printing of a job, from the job acceptance unit 10. The process proceeds to step S12, and the printing control unit 12 determines whether the normal printing of the preceding job is being performed in the printing unit 16.

If the normal printing of the preceding job is not being performed in the printing unit 16, the process proceeds to step S13, and the printing control unit 12 causes the printing unit 16 to perform trial printing or normal printing of the job for which the execution request has been accepted in step S11. If the normal printing of the preceding job is being performed in the printing unit 16, the process proceeds to step S14, and the printing control unit 12 determines whether the execution request that has been accepted in step S11 is trial printing.

If the accepted execution request is trial printing, the process proceeds to step S15, and the printing control unit 12 temporarily stops the normal printing of the preceding job being performed in the printing unit 16. In step S16, after the printing control unit 12 changes the job setting to the job setting of the trial printing of the succeeding job, the printing control unit 12 performs trial printing of the succeeding job in step S17. The printing control unit 12 requests the sheet ejection control unit 18 to eject the printed matter printed in trial printing from the discharge tray for trial printing, and performs control so that the printed matter printed in trial printing is not ejected from the discharge tray for normal printing.

The process proceeds to step S18, and the printing control unit 12 returns the job setting to the job setting of the normal printing of the preceding job, and then resumes the normal printing of the preceding job in step S19. If it is determined in step S14 that the execution request accepted in step S11 is not trial printing, the process proceeds to step S20, and the printing control unit 12 stores the execution request of the normal printing of the succeeding job so that the normal printing is started after the completion of the normal printing of the preceding job.

As illustrated in the flowchart of FIG. 9, in the image forming apparatus 1 of the present embodiment, the job setting needs to be changed in order to perform the trial printing of the succeeding job interrupting in the normal printing of the preceding job. When the job setting is changed, the printing unit 16 of the electrophotographic type requires some time to stabilize the print quality. On the other hand, even when the job setting is changed, since the printing unit 16 of the inkjet type almost does not need time to stabilize the print quality, the inkjet type is superior to the electrophotographic type in terms of operation efficiency.

Second Embodiment

In the first embodiment, an example has been described in which the operation screen 1000 in FIG. 8 is displayed on the operation panel 602 or the like of the image forming apparatus 1, and a request for executing normal printing or a request for executing trial printing is accepted from the operator. In the second embodiment, for example, the processing according to the present embodiment is implemented by the printing system illustrated in FIG. 10.

Figure 10:
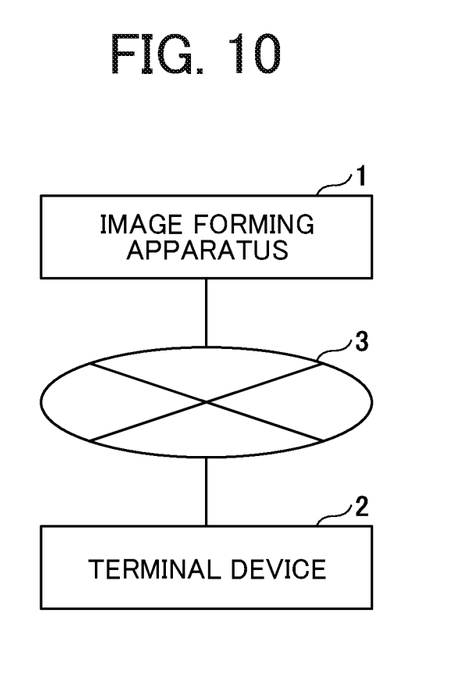
FIG. 10 is a configuration diagram of an example of a printing system according to an embodiment.

FIG. 10 is a configuration diagram of an example of a printing system according to the present embodiment. In the printing system of FIG. 10, the image forming apparatus 1 and a terminal device 2 are connected via a network. The terminal device 2 is an information processing terminal operated by an operator and is an information processing terminal such as a smartphone, a mobile phone, or a PC.

The terminal device 2 has a hardware structure that is substantially similar to the hardware structure of the computer illustrated in FIG. 3, except that the operation panel 602 is replaced with an input device and an output device. For example, the input device may be a keyboard and a mouse, and the output device may be a display. Alternatively, the operation panel 602 may be replaced with a touch panel functioning as the input and output device.

In one example of the second embodiment, the input device operates as the job acceptance unit 10 illustrated in FIG. 4 in the terminal device 2. Specifically, the input device receives a request for executing normal printing or trial printing, with information indicating a specific setting, from the operator. The communication I/F 604, which operates as a communication device, sends the request accepted by the input device to the image forming apparatus 1 through a network.

The image forming apparatus 1 receives the request for executing normal printing or trial printing from the terminal device 2, at the communication I/F 604 that operates as the job acceptance unit 10. Since the rest are similar to those of the first embodiment, description thereof is omitted.

In another example of the second embodiment, the terminal device 2 may receive a request for executing normal printing, and sends such request to the image forming apparatus 1. The image forming apparatus 1 performs the normal printing according to the request from the terminal device 2. While performing the normal printing, the image forming apparatus 1 may receive a request for executing trial printing of another job via the operation panel 602. In such case, the image forming apparatus 1 temporarily stops the normal printing being performed, changes the setting from the setting for the normal printing to the setting for the trial printing, and performs the trial printing.

In any one of the above-described embodiments, the recording medium on which an image is formed may be coated paper, cardboard, OHP, plastic film, prepreg, copper foil or the like, and is not limited to paper.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional recording medium. The recording medium includes a storage medium for storing processor readable code such as a floppy disk, hard disk, CD ROM, magnetic tape device or solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus, comprising:
a printing device configured to perform normal printing and trial printing of a job according to a printer job setting; and
processing circuitry configured to control the printing device to:
accept a request for executing printing of a second job while the printing device is performing the normal printing of a first job according to the printer job setting;
determine whether the second job is the normal printing or the trial printing;
control the printing device to interrupt the normal printing of the first job to perform the trial printing of the second job, based on the determination that the second job is for the trial printing;
control the printing device to set the printer job setting to the trial printing;

control an ejection device to discharge a recording medium printed in the normal printing of the first job and a recording medium printed in the trial printing of the second job on different sheet discharge trays; and control the printing device to set the printer job setting to the normal printing.

2. The image forming apparatus according to claim 1, further comprising:

an operation device configured to accept a job setting from an operator, wherein the processing circuitry is further configured to control the printing device to perform printing according to the job setting accepted from the operator.

3. The image forming apparatus according to claim 1, wherein, the processing circuitry is further configured to control the printing device to perform the normal printing of the second job after completion of the normal printing of the first job, based on the determination that the second job is for the normal printing.

4. The image forming apparatus according to claim 1, wherein the processing circuitry is further configured to control the printing device to change the printer job setting from the printer job setting for the normal printing to the printer job setting for the trial printing, based on the determination that the second job is for the trial printing.

5. The image forming apparatus according to claim 1, wherein the printing device ejects droplets onto a recording medium to form an image on a surface of the recording medium.

6. The image forming apparatus according to claim 1, wherein the printing device transfers a toner image onto a recording medium to form an image on a surface of the recording medium.

7. The image forming apparatus according to claim 1, wherein the processing circuitry is further configured determine whether the printing device is performing the normal printing of the first job.

8. The image forming apparatus according to claim 4, wherein the processing circuitry is further configured to control the printing device to change the printer job setting from the setting for the trial printing to the setting for the normal printing, after completion of the trial printing.

9. The image forming apparatus according to claim 1, wherein the processing circuitry is further configured to control the printing device to:

set a first job setting to the normal printing of the first job before executing the first job; and set a second job setting to the trial printing of the second job, while executing the first job, the second job setting being different from the first job setting.

10. The image forming apparatus according to claim 1, wherein the processing circuitry is further configured to control the printing device to:

set a first job setting to the normal printing of the first job before executing the first job;

set a second job setting to the trial printing of the second job, while executing the first job, the second job setting being different from the first job setting;

interrupt the normal printing of the first job to perform the trial printing of the second job based on the determination that the second job is for the trial printing, the second job being executed according to the second job setting; and resume the normal printing of the first job according to the first job.

11. An image forming system comprising:

a terminal device; and an image forming apparatus communicably connected with the terminal device and configured to perform printing, wherein the terminal device includes:

an input device configured to accept a request for executing printing of a job according to a job setting; and a first communication device configured to transmit the request to the image forming apparatus, and the image forming apparatus includes:

a printing device configured to perform normal printing and trial printing of the job according to the job setting;

a second communication device configured to receive the request for executing the printing of the job from the terminal device, while the printing device is performing the normal printing of the job;

processing circuitry configured to:

determine whether the request for executing printing of the job received from the terminal device is a request for executing the trial printing or the normal printing;

control the printing device to set the job setting to the trial printing;

control the printing device to interrupt the normal printing of the job to perform the trial printing of the job, based on the determination that the request is for the trial printing;

control the printing device to set the job setting to the normal printing; and control an ejection device to discharge a recording medium printed in the normal printing of the job and a recording medium printed in the trial printing of the job on different sheet discharge trays.

12. A control method for controlling printing, the printing performed by an image forming apparatus, the method comprising:

performing normal printing of a first job according to a job setting;

accepting a request for executing printing of a second job while a printing device is performing the normal printing of the first job according to the job setting;

determining whether the second job is for trial printing;

interrupting the normal printing of the first job, based on the determination that the second job is for the trial printing;

setting the job setting to the trial printing;

performing the trial printing of the second job;

discharging a recording medium printed in the normal printing and a recording medium printed in the trial printing on different sheet discharge trays; and setting the job setting to the normal printing.

13. A non-transitory recording medium which, when executed by one or more processors, cause the processors to perform a control method comprising:

controlling a printing device to perform normal printing of a job according to a job setting;

accepting a request for executing printing of a second job while the printing device is performing the normal printing of a first job according to the job setting;

determining whether the second job is for trial printing;

interrupting the normal printing of the first job being performed by the printing device, based on the determination that the second job is for the trial printing;

setting the job setting to the trial printing;

controlling the printing device to perform the trial printing of the second job;
controlling an ejection device to discharge a recording medium printed in the normal printing and a recording medium printed in the trial printing on different sheet discharge trays; and
setting the job setting to the normal printing.

\* \* \* \* \*